United States Patent
Palm et al.

(10) Patent No.: US 8,897,565 B1
(45) Date of Patent: Nov. 25, 2014

(54) EXTRACTING DOCUMENTS FROM A NATURAL SCENE IMAGE

(75) Inventors: Leon Palm, Santa Monica, CA (US); Hartwig Adam, Marina Del Ray, CA (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 13/538,145

(22) Filed: Jun. 29, 2012

(51) Int. Cl.
*G06K 9/00* (2006.01)

(52) U.S. Cl.
USPC ............ 382/182; 382/176; 382/283; 382/311

(58) Field of Classification Search
USPC ........................ 382/176, 182, 283, 181, 311
See application file for complete search history.

(56) References Cited

U.S. PATENT DOCUMENTS

| | | | |
|---|---|---|---|
| 7,085,437 B2 * | 8/2006 | Nakajima et al. | 382/311 |
| 7,738,706 B2 * | 6/2010 | Aradhye et al. | 382/182 |
| 8,009,928 B1 * | 8/2011 | Manmatha et al. | 382/283 |
| 8,320,674 B2 | 11/2012 | Guillou et al. | |
| 2003/0190145 A1 * | 10/2003 | Copperman et al. | 386/69 |
| 2003/0219149 A1 * | 11/2003 | Vailaya et al. | 382/128 |
| 2004/0076342 A1 * | 4/2004 | Wolff et al. | 382/294 |
| 2005/0201619 A1 | 9/2005 | Sun et al. | |
| 2012/0134588 A1 * | 5/2012 | Zhang et al. | 382/176 |
| 2013/0004076 A1 * | 1/2013 | Koo et al. | 382/176 |

* cited by examiner

*Primary Examiner* — Gregory M Desire
(74) *Attorney, Agent, or Firm* — Fish & Richardson P.C.

(57) ABSTRACT

The present technology proposes techniques for extracting forms and other types of documents from images taken with a mobile client device. By calculating and making adjustments along a document's detected borders, an input image can be transformed such that the document within the image may be properly aligned and background clutter completely removed. The resulting text fields of the extracted document are thus upright, aligned and locatable at predictable points.

18 Claims, 7 Drawing Sheets

EXTRACTING DOCUMENTS FROM A NATURAL SCENE IMAGE

BACKGROUND

The subject matter described herein generally relates to extracting documents from a natural scene image taken with a mobile device.

Many mobile devices tend to take blurred low resolution images and as a result of perspective effects, for example, photographing a document at an angle, text embedded in the document may often be deformed, rotated and skewed. Typically, users taking these images may be constrained by the size, position and font of the embedded text. In this regard, the users may have to carefully align the text with guidelines or have the images sent to an operator that may prompt the users to manually confirm important fields.

SUMMARY

Aspects of the present technology may be advantageous for rapidly extracting forms and other types of documents from a natural scene image without human intervention or costly and specialized equipment. By introducing techniques to use a processor to detect a document along its borders, the natural scene image may be transformed resulting in an extracted document image that may be upright and properly aligned. Thus, text fields of the extracted document may be upright, aligned and locatable at predictable points.

One aspect of the present technology provides a method. The method includes receiving a digital image that includes at least one document with a background scene, detecting with a processor a number of edges in the image, and selecting regions of the image corresponding to the detected edges. For each selected region, mapping coordinates may be computed based on characteristics of the selected region. The method also includes rectifying with the processor the selected regions based on the mapping coordinates and normalizing the selected regions that are rectified. In that regard, the background scene may be removed from the selected regions.

In one example, detecting the number of edges may further include selecting a first edge and identifying other edges having a brightness level lower than the first edge that are within a predetermined range. In this example, the first edge has a brightness level above the predetermined range and the other edges are joined to the first edge. In another example, the method may also include determining with the processor that text is present in the selected regions and extracting the text. In yet another example, rectifying the selected regions may further include calculating an quadrilateral based on a given selected region, comparing with the processor an area of the quadrilateral to an area of the given selected region and multiplying, based on the comparison, pixels of the given selected region by pixels of the quadrilateral if a ratio of the areas do not meet a threshold value. In this regard, the quadrilateral may include at least four corners that consist of intersecting edges. The results of the multiplication may be mapped using the mapping coordinates so as to remove the background scene in the given selected region.

Another aspect of the present technology provides a system that includes a memory storing a digital image that includes at least one document with a background scene and a processor coupled to the memory. The processor may be configured to detect a number of edges in the image stored in memory, select regions of the image corresponding to the detected edges. For each selected region, mapping coordinates may be computed based on characteristics of the selected region. The processor may be further configured to rectify selected regions based on the mapping coordinates and normalize the selected regions that are rectified. In that regard, the background scene may be removed from the selected regions.

Yet another aspect of the present technology provides a tangible computer-readable storage medium that includes instructions of a program, when executed by a processor, cause the processor to perform a method. The method includes receiving a digital image that includes at least one document with a background scene, detecting with a processor a number of edges in the image, and selecting regions of the image corresponding to the detected edges. For each selected region, mapping coordinates may be computed based on characteristics of the selected region. The method also includes rectifying with the processor the selected regions based on the mapping coordinates and normalizing the selected regions that are rectified. In that regard, the background scene may be removed from the selected regions.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In the subject matter described herein a processor may be used to extract forms and other types of documents from a natural scene image, e.g., an image of document that includes a background scene. According to some aspects, by calculating and making adjustments along detected boarders of a document, background clutter and other noise in a source image can be removed. The image may be thus transformed such that detected documents are vertically and horizontally aligned. As a result, text fields in a processed document image can be made upright, aligned and locatable at predictable points, such as a form document. Thus, it may be possible to extract the text, for example, using various optical character recognition (OCR) techniques, despite receiving a low resolution source image.

Figure 1:
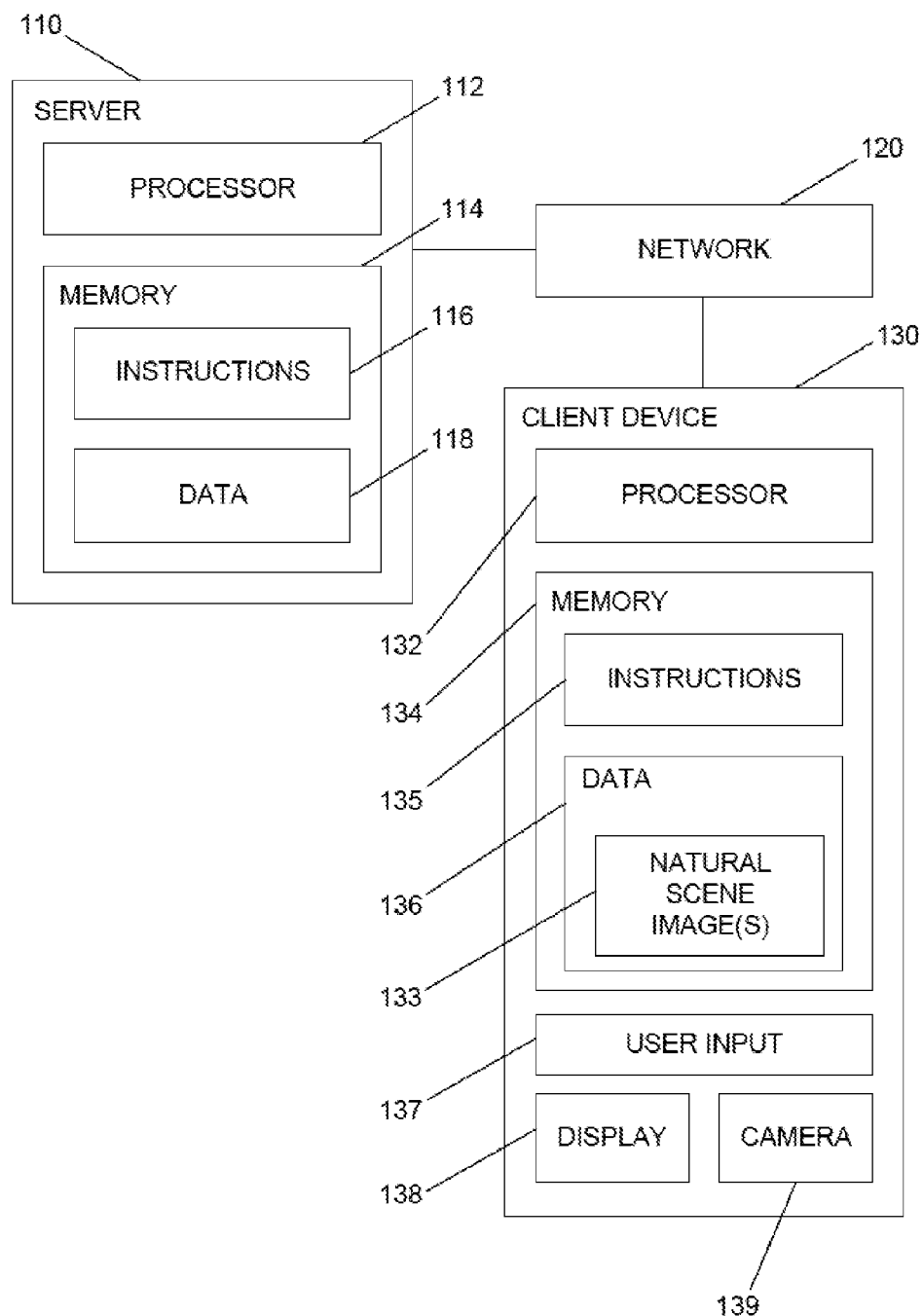
FIG. 1 is a block diagram of a system in accordance with one aspect of the present technology.

FIG. 1 is a block diagram of a system 100. As shown, the system 100 may include a server 110 coupled to a network 120. The system may also include a client device 130 capable of wireless communication with the server 110 over the network 120.

The server 110 can contain a processor 112, memory 114, and other components typically present in general purpose computers. The memory 114 of server 110 can store information accessible by the processor 112, including instructions 116 that may be executed by the processor 112. Memory may also include data 118 that can be retrieved, manipulated or stored by the processor 112. The memory 114 can be a type of non-transitory computer readable medium capable of storing information accessible by the processor 112, such as a hard-drive, memory card, ROM, RAM, DVD, CD-ROM, write-capable, and read-only memories. The processor 112 can be a well-known processor, or other lesser-known types of processors. Alternatively, the processor 112 can be a dedicated controller such as an ASIC.

The instructions 116 can be a set of instructions executed directly, such as machine code, or indirectly, such as scripts, by the processor 112. In this regard, the terms "instructions," "steps" and "programs" may be used interchangeably herein. The instructions 116 can be stored in object code format for direct processing by the processor 112, or other types of computer language including scripts or collections of independent source code modules that are interpreted on demand or compiled in advance. Functions, methods and routines of the instructions are explained in more detail below.

The data 118 can be retrieved, stored or modified by the processor 112 in accordance with the instructions 116. For instance, although the subject matter described herein is not limited by a particular data structure, the data 118 can be stored in computer registers, in a relational database as a table having a number of different fields and records, or XML documents. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories including other network locations or information that is used by a function to calculate relevant data. For example, the data 118 can include image data that may be encoded into various digital formats based on the instructions 132.

Although FIG. 1 functionally illustrates the processor 112 and memory 114 as being within the same block, the processor 112 and memory 114 may actually include multiple processors and memories that may or may not be stored within the same physical housing. For example, some of the instructions and data can be stored on a removable CD-ROM and others within a read-only computer chip. Some or all of the instructions and data can be stored in a location physically remote from, yet still accessible by, the processor 112. Similarly, the processor 112 may actually include a collection of processors, which may or may not operate in parallel.

The server 110 can be at one node of network 120 and capable of directly and indirectly communicating with other nodes of the network 120. For example, the server 110 can include a web server that may be capable of communicating with the client device 130 using network 120 such that it uses the network 120 to transmit and display information to a user on display 138 of the client device 130. Server 110 can also include a number of computers, e.g., a load balanced server farm, that exchange information with different nodes of a network for the purpose of receiving, processing and transmitting data to client devices. In this instance, the client devices will typically still be at different nodes of the network 120 than the computers making up server 110.

Each client device 130 can be configured similarly to server 110, with a processor 132, memory 134, instructions 135, and data 136. Each client 130 may be a personal computer having all the internal components normally found in a computer such as a central processing unit (CPU), display device 138, for example, a monitor having a screen, a projector, a touch-screen, a small LCD screen, a television, or another device such as an electrical device that can be operable to display information processed by the processor, a CD-ROM, hard drive, user input 137, for example, a mouse, keyboard, touch screen or microphone, speakers, a modem and/or network interface device, such as a telephone, cable or otherwise, and all of the components used for connecting these elements to one another. Moreover, computers in accordance with the subject matter described herein may include devices capable of processing instructions and transmitting data to and from humans and other computers including general purpose computers, PDAs, network computers lacking local storage capability, set top boxes for televisions, and other networked devices.

Although the device 130 can include a full-sized personal computer, the subject matter described herein may also be used in connection with mobile devices capable of wirelessly exchanging data over a network such as the Internet. By way of example only, client device 130 may be a wireless-enabled PDA, tablet PC, or a cellular phone capable of sending information using the Internet. The user can input information, for example, using a small keyboard, a keypad, or a touch screen. According to various aspects of the subject matter described herein may be performed by the client device 130, the server 110, or by some combination thereof.

As shown in FIG. 1, the client device 130 may include a camera module 139, which can be used to capture images of an object, such as a document in a natural scene. For example, the client device 130 may be connected to a digital camera that may operate in conjunction with the client device 130. The camera module 139 may also operate in conjunction with other image capturing systems known in the arts, such as a camera in a mobile phone or other devices with image capture features. The client device 130 is shown coupled to memory 134, which can store captured natural scene images 133. Images can also be stored on a removable medium, such as a disk, tape, SD Card or CD-ROM, which can be connected to system 100. The client device 130 may digitally format the captured images 133. More specifically, captured images 133 may be passed to the client device 130 where the processor 132 may convert the captured images 133 to a digital format that includes a large number of pixels.

Although only one server is depicted in FIG. 1, the system can include a large number of connected servers, with each different server being at a different node of the network 120. The network 120, and intervening nodes, can include various configurations and protocols including the Internet, World Wide Web, intranets, virtual private networks, wide area networks, local networks, private networks using communication protocols proprietary to one or more companies, Ethernet, WiFi, such as 802.11, 802.11b, g, n, or other such standards, and HTTP, and various combinations of the foregoing. Such communication may be facilitated by a device capable of transmitting data to and from other computers, such as modems, dial-up, cable, fiber-optic, and wireless interfaces.

Figure 2:
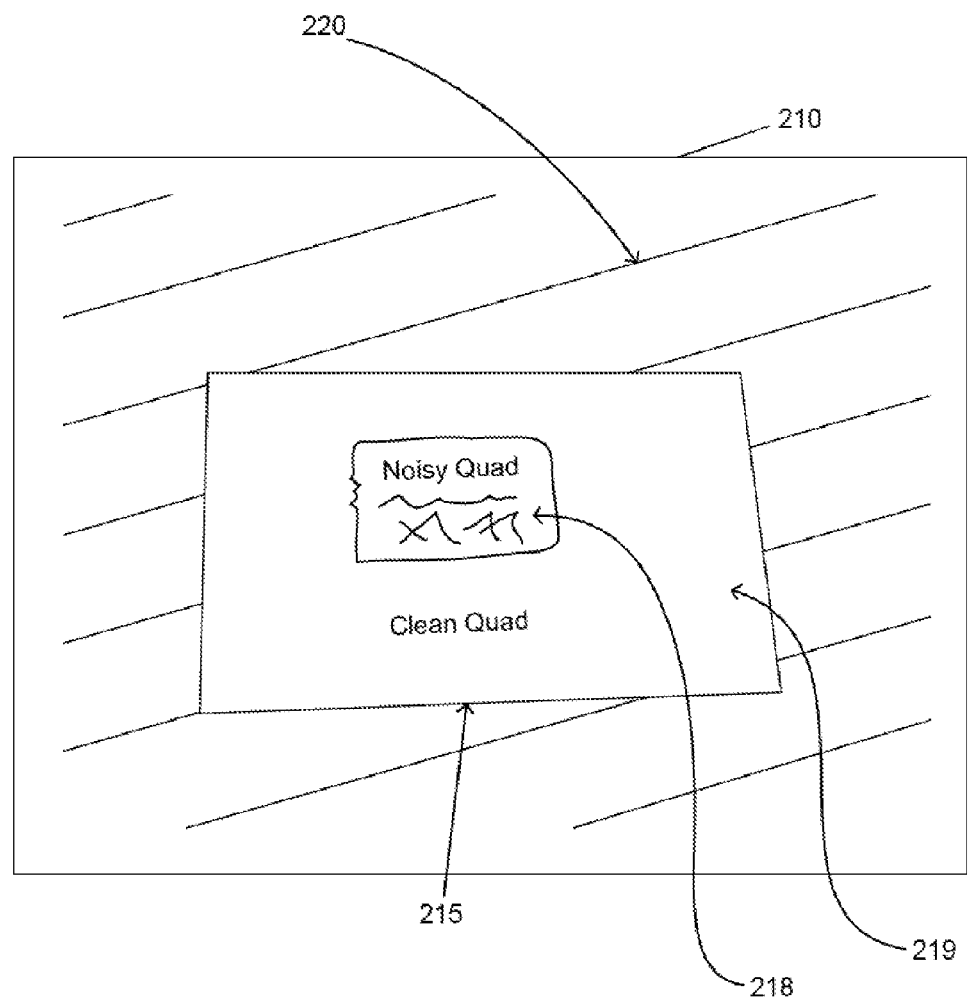
FIG. 2 is an image of a document in a natural scene.

FIG. 2 is an image 210 of a document 215 in a natural scene. The image 210 may have been captured using, for example, an image capturing device such as the client device described with respects to FIG. 1. As shown, the image may include a document 215 that may be under some type of perspective deformation. For example, the digital image may have been taken at an angle. Accordingly, text in the document can appear skewed or larger in portions with respects to others. Moreover, a background scene and/or noise 220, e.g., variation of brightness or color information in images, can appear in the image 215. The noise can appear, for example, as random speckles and lines 218 on an otherwise smooth surface 219 and may significantly degrade image quality.

In one aspect, a processor may analyze the image 210 in order to identify portions that appear to include quadrilaterals, such as document 215. The subject matter described below can process this image to extract zero or more images based on the detected quadrilaterals. For example, by analyzing both gradient strength and line ordination, multiple quadrilaterals can be detected where intersecting line segments have four corner vertices in close proximity to each other, such as the respective four corners of Noisy Quad and Clean Quad in FIG. 2. The image processing techniques are described in further detail with respects to FIG. 3.

In addition to the components described above and illustrated in the figures, various operations will now be described for extracting forms and other types of documents from a natural scene image. The operations described below can be performed in part or in their entirety on a mobile client device as described with respects to FIG. 1, such as a mobile phone, on a remote computing device, such as a server, or on some combination thereof. The operations do not have to be performed in the precise order described below. Rather, various steps may be handled in a different order or simultaneously. Steps can also be added or omitted unless otherwise stated.

Figure 3:
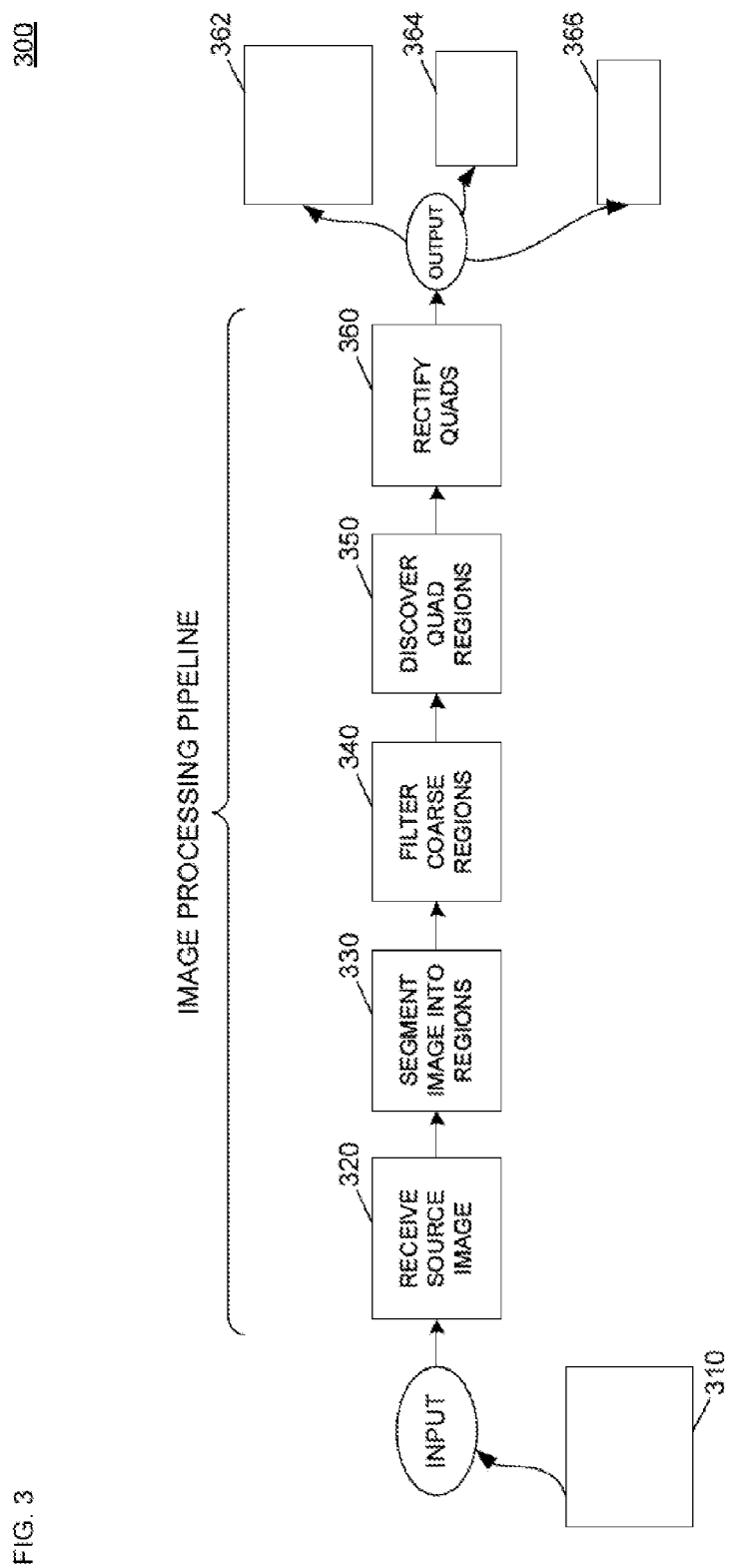
FIG. 3 is a flow diagram of a method for extracting quadrilaterals from an image in accordance with one aspect of the present technology.

FIG. 3 is a flow diagram of a method 300 for extracting quadrilaterals from an image 310. As illustrated, a source image 310 may be processed through an image processing pipeline resulting in zero or more outputted images 362, 364, 366 that may be possible quadrilaterals detected in the image 310. Each block 320-360 of the image processing performed in the pipeline may include of a series of discrete operations. This may mean that the output of one process can be the input of the next process. The image processing method 300 described below can be performed in part or in its entirety on a mobile client device, such as a mobile phone, on a remote computing device such as a server, or on some combination thereof.

In block 320, a digital image may be received. The image can arrive in various supported formats, such as a string-encoded image format, PIX, e.g., a native pixel format, and a data structure, such as CvMAT. According to aspects, the digital images can be organized by various compression techniques and stored in a number of different formats. If an image arrives in an unsupported format, it can be converted into a supported format, such as CvMAT, using various image conversion tools. In one example, the input image may be converted to grayscale, to remove shot and mosquito noise, e.g., noticeable digital image distortions and artifacts, caused by technical features of an image capturing device such as its charge coupled device (CCD) and/or image compression technology.

In block 330, the image may be segmented into regions. For example, a source image may be analyzed in one or more parallel sub-operations also known as segmenters. The segmenters may output a set of regions from the image where region outlines or edges may roughly correspond to quadrilaterals in the image. To detect a wide range of edges within an input image various techniques can be employed such as Canny edge detection. For example, by using Canny edge detection, points can be identified in an image where an image's brightness changes sharply or may discontinue.

According to aspects, one way of discerning between edge strengths can be with a threshold value. For example, edges with pixel intensity values higher that the threshold may be marked as strong, very weak edges with pixel intensity values below the threshold can be suppressed, and edges between the two thresholds can be marked as weak. In one example, very strong edges are located and used as seeds that are a starting point for creating a quadrilateral outline. Other nearby edges can be joined through a closing on the edges. In this example, the seed edges can be adjusted by joining weaker edges that may neighbor existing edges, thus effectively tracing an outline of objects and quadrilaterals located in the image.

Some regions with low intensity gradients may be imprudently detected as quadrilaterals. This may be regions affected by noise or distortions in an image. For example, variations in brightness or color information can make regions appear as if the distortions represent an actual object in the image. It may be possible that these regions are outputted by segmenters as potential quadrilaterals.

Contiguous sets of edges can also be outputted by segmenters as potential quadrilateral regions. This may happen in situations where a detected quadrilateral is heavily textured, e.g., producing many tiny, irregular inter-edge regions, but the image background may not be. According to aspects, the outputted regions may be fairly quadrilateral in shape.

In block 340, coarse regions, e.g., non-quadrilaterals may be filtered out based on a predetermined filter criterion such as whether the regions are too large, small or oblong. As discussed above, some of the regions outputted in block 330 may not be quadrilaterals. Typically, non-quadrilateral regions can be quickly discarded based on their size and oblongness.

Different segmenters can return duplicate or very similar regions from the same image. As such, regions may be further analyzed to determine differences between a pair of regions based on, for example, their position and shape. If the differences reach a threshold value, one of the regions may be discarded, for example, this can be the more complex or larger of the two regions.

In block 350, quadrilaterals may be discovered by, for example, analyzing the regions output by the segmenters. To make this discovery, a closest-fitting convex quadrilateral, such as an ideal fitting model quadrilateral, can be computed and compared with each region not filtered out in block 340. According to aspects, to compute the closest-fitting convex quadrilateral to a region, the region's external outline may be transformed using various techniques such as Radon transform. For example, by using these techniques the region's strongest line features may be identified and extracted. The strongest line features may be four sides of a region. At this point, it may be still possible that a selected region is not quadrilateral. This can be a region that may be round, triangular or irregularly shaped. Such non-quadrilateral regions may have slipped through the filtering block 340 based on their size and proportions. In one example, regions having less than approximately four detected lines may be discarded in block 350.

To calculate a model quadrilateral for each region, intersections between all of the detected lines can be computed as well as their convex hull, e.g., points lying on an outer perimeter of the regions. Simplification techniques can be employed to reduce the convex hall to its salient points. For example, regions having less than approximately four salient points may be discarded.

In order to determine how well each region matches a calculated model quadrilateral, a difference map can be created. To create a difference map a binary operation such as XOR may be performed on corresponding bits from within a region and its corresponding model quadrilateral. The area of the difference map can be compared to the area of the model quadrilateral. If a ratio between the two areas does not meet a certain area threshold value, method 300 may determine that a selected region may be a quadrilateral and that it is possibly at a preferred location. Otherwise the selected regions may be discarded by method 300 because they are not quadrilaterals.

In block 360, extracted quadrilaterals that have not been discarded may be rectified. Rectification is a process of calculating a homography matrix, which may be used to map homogenous coordinates between the extracted quadrilaterals and the calculated model quadrilaterals. The homography matrix can be used to determine an alignment necessary to correctly blend together the two regions. According to aspects, calculating a homography matrix can involve identifying common feature points between the regions, e.g., distinguishable image pixels. For example, the homography matrix can be computed using functions based on openCV such as getPerspectiveTransform, which takes as inputs (1) four corners of a model quadrilateral and (2) four corners of an extracted quadrilateral. The function may attempt to find with least error a mapping between the two regions based on the inputted corners, e.g., common feature points. In some aspects, calculated results returned by the function may be a perspective transformation of the extracted quadrilateral represented by a homography matrix of 3 rows and 3 columns.

To produce rectified images of the extracted quadrilaterals stretched to fit a reference space, every pixel point in an original image may be multiplied by every pixel point in the calculated homography matrix. For example, if the original image is an n-by-m bitmap matrix and the calculated homography is an m-by-p bitmap matrix, the resulting matrix of their multiplication may be an n-by-p matrix where the number of columns m of the original image is equal to the number of rows of the calculated homography.

As previously discussed, a homography matrix calculated in this block 360 may be a 3×3 matrix. In this regard, a fixed depth of 1 may be used since a matrix multiplication may require that each point of an original image conform to a vector with 3 elements, e.g., otherwise the multiplication results may be undefined. For example, each point in the original image in a typical (x,y) coordinate system may become (x,y,1). Thus, multiplying this point by the homography matrix may generate a position of that point in a rectified frame. As an illustration, an equation for the above described matrix multiplication can be represented as follows:

$$3 \times 3 \text{ homography matrix} * \begin{bmatrix} x \\ y \\ 1 \end{bmatrix}$$

According to aspects, a perspective transformation of the extracted quadrilaterals can be specified by eight degrees of freedom or four (x,y) point mappings. For example, a homography matrix may map every point in a quadrilateral to a corresponding point in a rectangular area in a source image, thus creating a rectified image of a quadrilateral. Each rectified quadrilateral image 362, 364, 366 and its corresponding homography matrix may be outputted in block 360. Method 300 can take approximately 35 ms to process, e.g., a VGA formatted image.

It should be noted that the homography matrix calculated in block 360 can also be used to build an Augmented Reality (AR) interface by rendering changes of a rectified image back onto an original image. For example, by enhancing the rectified image, such as replacing its text or drawing over it, and multiplying the enhancements by an inverse matrix, the enhancements may appear in the source image's perspective.

Figure 4:
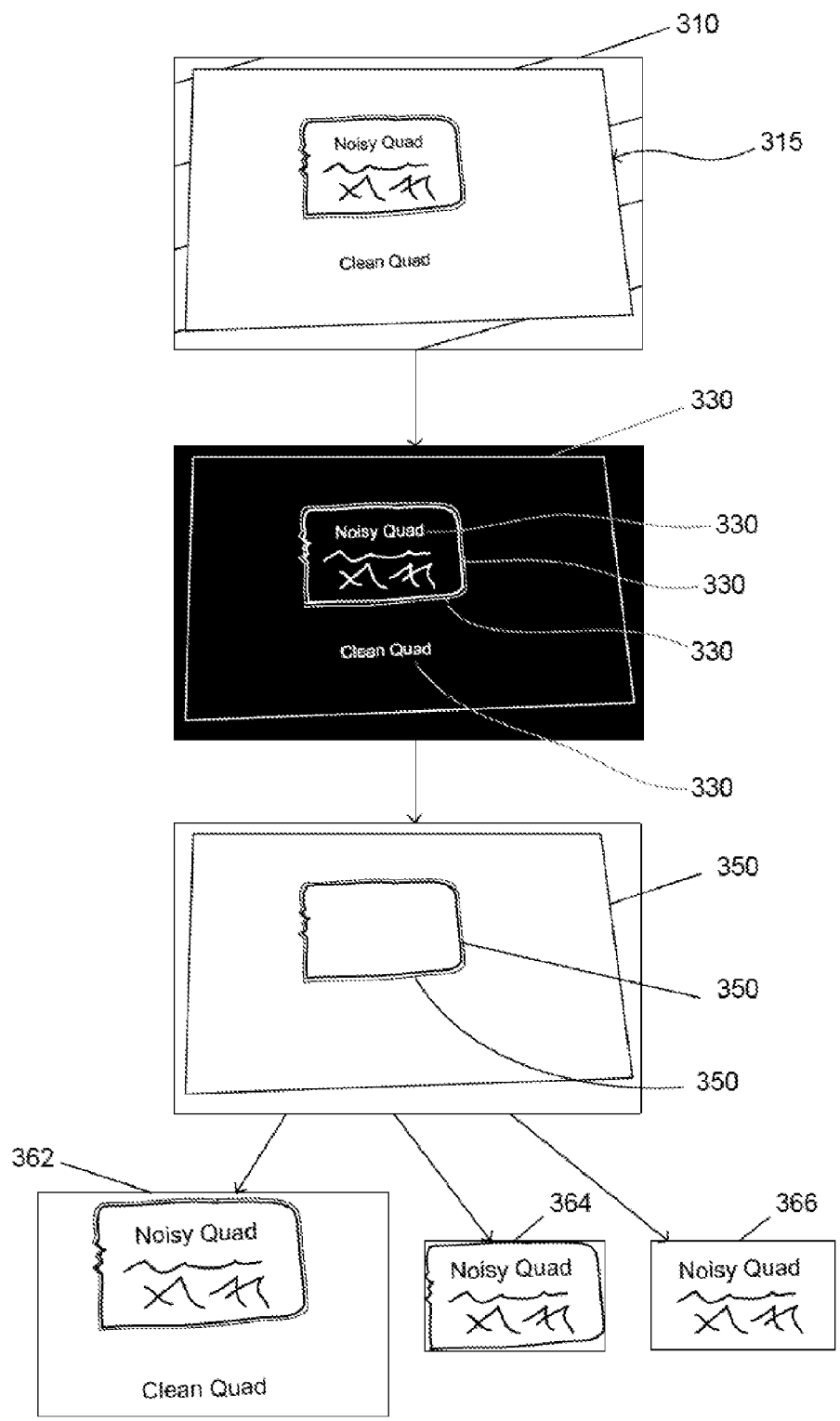
FIG. 4 illustrates an example of extracting quadrilaterals from a source image according to aspects of the present technology.

FIG. 4 illustrates an example of extracting quadrilaterals 362, 364, 366 from a source image 310. In this example, rectified images of quadrilaterals 362, 364, 366 may be returned from the source image 310 using the subject matter disclosed herein.

As discussed above, a source image 310 may be captured wherein a document 315 detected in the image 310 appears askew. This can be caused by many factors such as positioning of an image capture device, lighting, image compression technology and use of a low resolution lens.

The source image 310 can be sent to one or more segmenters, which may determine outlines in the image corresponding to possible quadrilaterals. The segmenters may produce one or more segmented quadrilateral candidates 330. As an example, segmented quadrilateral candidates 330 can be seen in FIG. 4 as inverted outlined areas.

According to aspects, through several iterative filtering techniques, "ideal" quadrilaterals candidates 350 may be determined. For example, ideal quadrilateral can be detected regions where four corners of the region are made up of intersecting lines. In this example, "ideal" candidates 350 are shown in FIG. 4 as solid outlines.

A rectified image of each quadrilateral 362, 364 and 366 may be produced by fitting a quadrilateral region of the source image 310 into a rectified image space. As a result of rectification, the entire background, e.g., anything but the actual quadrilateral, of the original image 310 can be removed. For an image of a form this may mean that only the form is visible in the rectified image. According to aspects, techniques can then be used to improve the image's contrast such as thresholding pixels more than 50% white to 100% white. Moreover, powerful color and contrast normalization method can be applied to the rectified images of the quadrilaterals 362, 364, 366, which can increase image clarity during other processing steps, such as attempting to extract text using OCR techniques.

Figure 5:
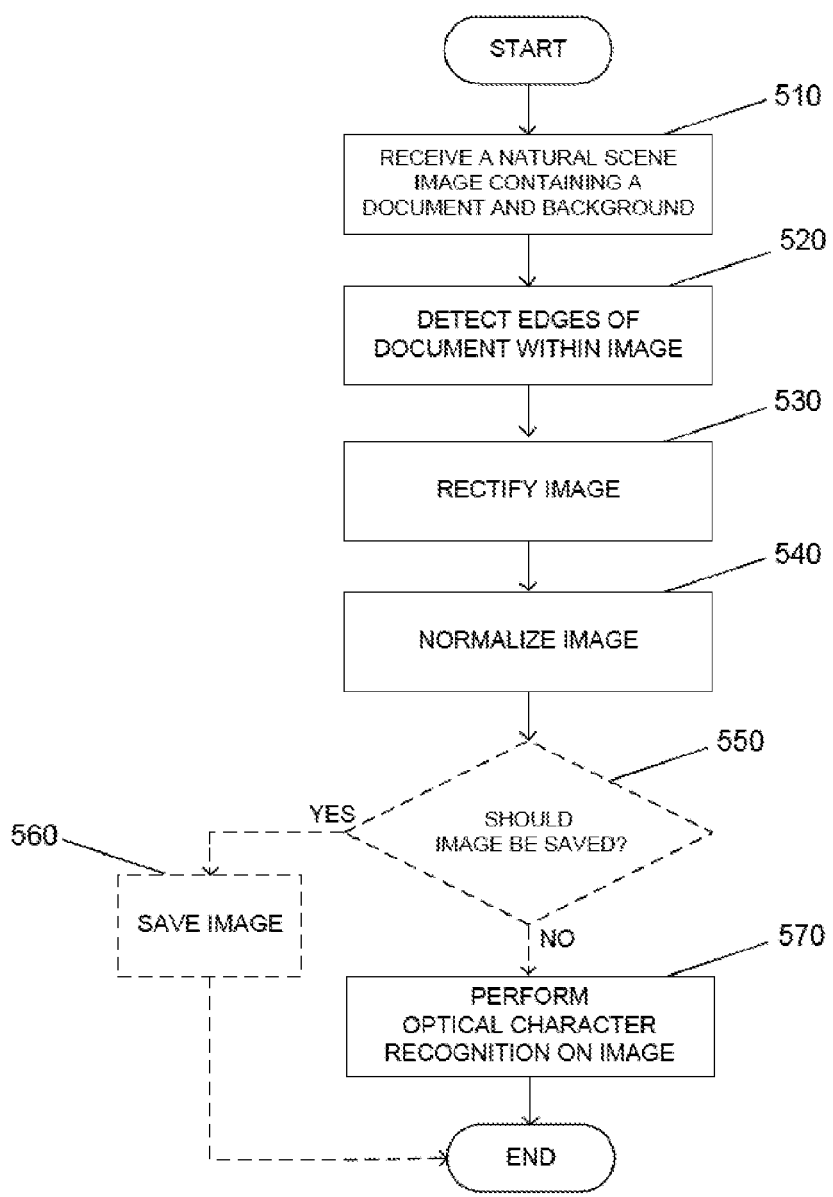
FIG. 5 is a flow diagram illustrating a method for extracting text from an image in accordance with one aspect of the present technology.

FIG. 5 is a flow diagram illustrating a method 500 for extracting text from an image. By rectifying quadrilaterals from a natural scene image using the above described procedures, textual information may be more easily extracted from the images.

At stage 510, a source image containing at least one document and background may be received, for example, by capturing the image with a mobile phone camera. Due do the nature of a hand-held mobile device, it may be difficult and sometimes impossible to take a perfect, straight-on picture of the document. Typically, an OCR can often fail to recognize text when applied to such images.

At stage 520, edges of the document within the source image may be detected. The edges of the document may be extracted from the image in order to map those edges to a rectified image. This stage may use characteristics such as size, shape and line features to select edges most likely to be outlines of the document against the image background. In one aspect, document corner locations can be estimated and used to generate a homography matrix.

At stage 530, the source image may be rectified to produce an un-skewed view of the embedded document, thereby making OCR possibly easier. As discussed above, a rectified image may be produced by multiplying the source image by the homography matrix. By stretching corners of the rectified image to corners of the document image, background noise can be eliminated while keeping all of the document's area un-skewed and in view. In one example, coordinates in the document can be mapped from the rectified image, thus allowing for an extraction of text fields.

At stage 540, the rectified image may be normalized. Because the rectified image may only contain a document, image optimization techniques can be employed at stage 530 to enhance an OCR's accuracy. For example, by stretching an image's histogram or by changing a range of pixel intensity values in the image its contrast may be normalized. This can have the desired effect of removing non-text noise and shading from the image, and may also facilitate in the separation of the document image from its background.

At stage 550, method 500 may optionally prompt a user to determine whether an image should be saved. The prompt may direct a user to accept or reject an action to be employed on a set of images. For example, a display might indicate which images may be saved. If it is determined that an image may be saved then method 500 may proceed to stage 560 where the image may be saved, otherwise it may proceed to 570.

At stage 560, images can be saved. For example, image saving can be employed by an image copying utility, a computer program or other types of image copying techniques. According to aspects, the saved images may be stored on a type of non-transitory computer readable medium capable of storing information that may be read by a processor such as a hard-drive, memory card, ROM, RAM, DVD, CD-ROM, write-capable, and read-only memories. Saving the rectified image may be beneficial because all background noise may have been removed, so only the interesting parts of an image are saved. In one aspect, the saved image data may be used by various applications, for example, an Augmented Reality (AR) interface.

As a result of rectification, the resulting images may be smaller, e.g., less storage requirements, and easier to read since the text and images may be upright and unskewed. In one example, a saved image file may be reduced in size by 88% without noticeably reducing quality, such as saving the image as a 1-bit black and white image rather than in 8 bit grayscale.

At stage 570, various types of OCR techniques can be applied for extracting information from a rectified image. For example, a checkbox on a document image can be analyzed for marks, e.g., signs of ink, using an OCR to sample their locations, which may be at a constant position in a rectified image. Once a specific type of character is identified, it may be extracted from the document. To improve OCR accuracy when applied to a rectified image, rectification as described above should be employed on the image before it is optimized.

Figure 6:
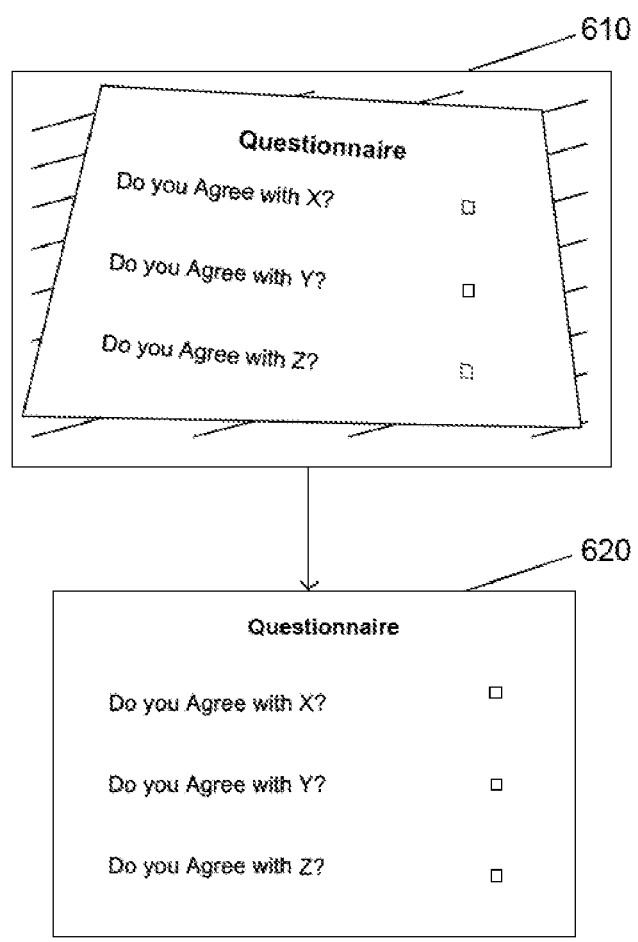
FIG. 6 illustrates an example of a rectified document image according to aspects of the present technology.

FIG. 6 illustrates an example of a rectified document image 620. According to aspects, the rectified image 620 may be produced from an original image 610. The original image 610 illustrates a typical image that has been captured under some type of perspective deformation. As shown, the document image can be at an angle and text fields within the image can be slanted and distorted. After rectification of the original image 610, the text fields in the rectified image 620 may appear upright, aligned and often locatable at predictable points. This can improve the overall accuracy of an OCR applied to the rectified image 620. It is important to note that normalizing an image, e.g., engaging a process that changes a range of pixel intensity values, before rectification can be employed on the image may produce undesired effects.

Figure 7:
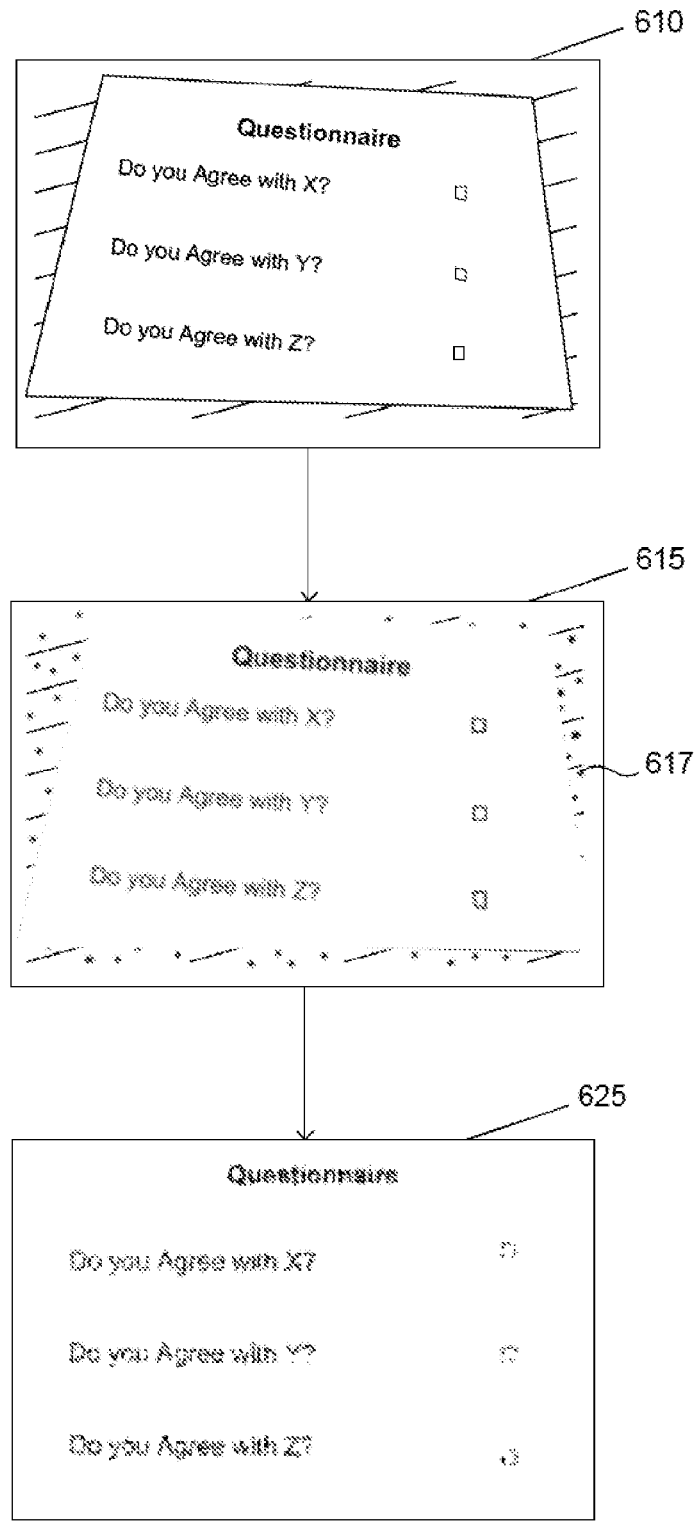
FIG. 7 illustrates an example of a rectified document image that has been first.

FIG. 7 illustrates an example of a rectified document image 620 that has been first normalized. As shown, the source image 610 from FIG. 6 has been normalized, thereby producing normalized image 615. In the normalized image 615, some portions of text have been erased. This may be due to, for example, background changes configured by a user in the ratios of dark to light pixels. Rectification applied to this normalized image 615 can produce results which may cause multiple OCR errors. For example, after normalization an outline of the document may be gone, text can become blurred and noise 617 may have been added in the background of the image 615. As a result, the overall accuracy of an OCR can significantly decrease if applied to a rectified image 625 of the normalized photo.

The above-described aspects of the present technology may be advantageous for rapidly extracting forms and other types of documents from a natural scene image. According to some aspects, this can be accomplished without human intervention or costly and specialized equipment. By introducing techniques to use a processor to detect a document along its borders, an input image under some type of perspective effect may be efficiently transformed resulting in an extracted document image that may be upright and properly aligned. Furthermore, the various techniques and parameters disclosed within can be further reconfigured so that the overall runtime performance may decrease.

Although the present technology has been described with reference to particular embodiments, these examples are merely illustrative of the principles and applications of the present technology. For example, the subject matter described herein can be performed in part or in its entirety on a mobile client device, such as a mobile phone, on a remote computing device, such as a server, or on some combination thereof. Additionally, numerous other modifications could be made to the illustrative embodiments. However, these and that other arrangements may be devised without departing from the spirit and scope of the present technology as defined by the appended claim.

The invention claimed is:

1. A computer-implemented method comprising:
receiving an input image;
automatically identifying, by one or more computing devices, a non-rectangular, quadrilateral-shaped region within the input image;
mapping, by the one or more computing devices, the non-rectangular, quadrilateral-shaped region of the image to a rectangular-shaped output image; and
providing the output image for processing by an optical character recognition engine.

2. The method of claim 1, wherein automatically identifying a non-rectangular, quadrilateral-shaped region within the input image comprises:
detecting, by the one or more computing devices, one or more edges of the non-rectangular, quadrilateral-shaped region in the input image; and
identifying, by the one or more computing devices, the non-rectangular, quadrilateral-shaped region based on the detected one or more edges.

3. The method of claim 2, wherein detecting one or more edges of the non-rectangular, quadrilateral-shaped region in the input image comprises:
detecting, by the one or more computing devices, one or more changes in brightness of one or more portions of the input image; and
determining, by the one or more computing devices, the one or more detected changes in brightness are due to a presence of one or more edges of the non-rectangular, quadrilateral-shaped region.

4. The method of claim 1, wherein automatically identifying a non-rectangular, quadrilateral-shaped region within the input image comprises:
  segmenting the input image into a set of regions that correspond to a set of candidate non-rectangular, quadrilateral-shaped regions that includes the non-rectangular, quadrilateral-shaped region; and
  selecting the non-rectangular, quadrilateral-shaped region from the set of candidate non-rectangular, quadrilateral-shaped regions.

5. The method of claim 4, wherein selecting the non-rectangular, quadrilateral-shaped region from the set of candidate non-rectangular, quadrilateral-shaped regions comprises:
  filtering out candidate non-rectangular, quadrilateral-shaped regions from the set of candidate non-rectangular, quadrilateral-shaped regions that are larger than an area threshold or more oblong than an oblong threshold.

6. The method of claim 4, wherein selecting the non-rectangular, quadrilateral-shaped region from the set of candidate non-rectangular, quadrilateral-shaped regions comprises:
  filtering out candidate non-rectangular, quadrilateral-shaped regions from the set of candidate non-rectangular, quadrilateral-shaped regions that are duplicative.

7. The method of claim 1, wherein mapping the non-rectangular, quadrilateral-shaped region of the image to a rectangular-shaped output image comprises:
  identifying corners in the non-rectangular, quadrilateral-shaped region; and
  mapping the identified corners to corresponding corners of a rectangular-shaped region.

8. The method of claim 1, wherein automatically identifying a non-rectangular, quadrilateral-shaped region within the input image comprises:
  detecting lines in the non-rectangular, quadrilateral-shaped region;
  calculating a model quadrilateral for the non-rectangular, quadrilateral-shaped region based on the lines;
  determining that the model quadrilateral matches the non-rectangular, quadrilateral-shaped region by a threshold amount; and
  identifying the non-rectangular, quadrilateral-shaped region based on determining that the model quadrilateral matches the non-rectangular, quadrilateral-shaped region by the threshold amount.

9. A system comprising:
  one or more computers and one or more storage devices storing instructions that are operable, when executed by the one or more computers, to cause the one or more computers to perform operations comprising:
  receiving an input image;
  automatically detecting one or more edges of a non-rectangular, quadrilateral-shaped region in the input image;
  identifying the non-rectangular, quadrilateral-shaped region based on the detected one or more edges;
  mapping the non-rectangular, quadrilateral-shaped region of the image to a rectangular-shaped output image; and
  providing the output image for processing by an optical character recognition engine.

10. The system of claim 9, wherein detecting one or more edges of the non-rectangular, quadrilateral-shaped region in the input image comprises:
  detecting one or more changes in brightness of one or more portions of the input image; and
  determining the one or more detected changes in brightness are due to a presence of one or more edges of the non-rectangular, quadrilateral-shaped region.

11. The system of claim 9, wherein identifying the non-rectangular, quadrilateral-shaped region based on the detected one or more edges comprises:
  segmenting the input image into a set of regions that correspond to a set of candidate non-rectangular, quadrilateral-shaped regions that includes the non-rectangular, quadrilateral-shaped region; and
  selecting the non-rectangular, quadrilateral-shaped region from the set of candidate non-rectangular, quadrilateral-shaped regions.

12. The system of claim 11, wherein selecting the non-rectangular, quadrilateral-shaped region from the set of candidate non-rectangular, quadrilateral-shaped regions comprises:
  filtering out candidate non-rectangular, quadrilateral-shaped regions from the set of candidate non-rectangular, quadrilateral-shaped regions that are larger than an area threshold or more oblong than an oblong threshold.

13. The system of claim 11, wherein selecting the non-rectangular, quadrilateral-shaped region from the set of candidate non-rectangular, quadrilateral-shaped regions comprises:
  filtering out candidate non-rectangular, quadrilateral-shaped regions from the set of candidate non-rectangular, quadrilateral-shaped regions that are duplicative.

14. The system of claim 9, wherein mapping the non-rectangular, quadrilateral-shaped region of the image to a rectangular-shaped output image comprises:
  identifying corners in the non-rectangular, quadrilateral-shaped region; and
  mapping the identified corners to corresponding corners of a rectangular-shaped region.

15. A non-transitory computer-readable medium storing software comprising instructions executable by one or more computers which, upon such execution, cause the one or more computers to perform operations comprising:
  receiving an input image;
  detecting one or more changes in brightness of one or more portions of the input image;
  detecting one or more edges of a non-rectangular, quadrilateral-shaped region in the input image based on the detected one or more changes in brightness of one or more portions of the input image;
  identifying the non-rectangular, quadrilateral-shaped region based on the detected one or more edges;
  identifying a non-rectangular, quadrilateral-shaped region within the input image;
  mapping the identified non-rectangular, quadrilateral-shaped region of the image to a rectangular-shaped output image; and
  providing the output image for processing by an optical character recognition engine.

16. The medium of claim 15, wherein identifying the non-rectangular, quadrilateral-shaped region based on the detected one or more edges comprises:
  segmenting the input image into a set of regions that correspond to a set of candidate non-rectangular, quadrilateral-shaped regions that includes the non-rectangular, quadrilateral-shaped region; and
  selecting the non-rectangular, quadrilateral-shaped region from the set of candidate non-rectangular, quadrilateral-shaped regions.

17. The medium of claim 16, wherein selecting the non-rectangular, quadrilateral-shaped region from the set of candidate non-rectangular, quadrilateral-shaped regions comprises:

filtering out candidate non-rectangular, quadrilateral-shaped regions from the set of candidate non-rectangular, quadrilateral-shaped regions that are larger than an area threshold or more oblong than an oblong threshold.

18. The medium of claim 16, wherein selecting the non-rectangular, quadrilateral-shaped region from the set of candidate non-rectangular, quadrilateral-shaped regions comprises:

filtering out candidate non-rectangular, quadrilateral-shaped regions from the set of candidate quadrilateral-shaped regions that are duplicative.

* * * * *